(12) United States Patent
Teraoka

(10) Patent No.: US 11,983,526 B2
(45) Date of Patent: May 14, 2024

(54) SOFTWARE INQUIRY INFORMATION MANAGEMENT SYSTEM AND SOFTWARE INQUIRY INFORMATION MANAGEMENT METHOD

(71) Applicant: HITACHI, LTD., Tokyo (JP)

(72) Inventor: Hidetoshi Teraoka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 547 days.

(21) Appl. No.: 17/349,105

(22) Filed: Jun. 16, 2021

(65) Prior Publication Data

US 2021/0389945 A1 Dec. 16, 2021

(30) Foreign Application Priority Data

Jun. 16, 2020 (JP) .................................. 2020-103624

(51) Int. Cl.
*G06F 8/74* (2018.01)
*G06F 8/65* (2018.01)
(Continued)

(52) U.S. Cl.
CPC .................. *G06F 8/74* (2013.01); *G06F 8/65* (2013.01); *G06F 8/71* (2013.01); *G06Q 30/018* (2013.01);
(Continued)

(58) Field of Classification Search
CPC .... B60L 3/0076; B60L 227/40; B60R 116/03; G06F 8/74; G06F 8/65; G06F 8/71;
(Continued)

(56) References Cited

U.S. PATENT DOCUMENTS

| 10,592,231 | B2 * | 3/2020 | Sakurai ..................... G06F 8/65 |
| 2004/0260751 | A1 * | 12/2004 | Schloesser ................ G06F 8/64 |
| | | | 709/200 |
| 2020/0057630 | A1 * | 2/2020 | Cho .......................... G06F 8/65 |

FOREIGN PATENT DOCUMENTS

EP 3557849 A1 10/2019
EP 3605320 A1 * 2/2020 ............ G06F 11/327
(Continued)

OTHER PUBLICATIONS

Extended European Search Report dated Oct. 27, 2021 for European Patent Application No. 21179693.3.
(Continued)

*Primary Examiner* — Patrick McAtee
*Assistant Examiner* — Nakia Leffall-Allen
(74) *Attorney, Agent, or Firm* — Volpe Koenig

(57) ABSTRACT

A software inquiry information management system stores a device request specification in association with a regulation ID that is information specifying a regulation that defines a requirement for receiving legal approval for a vehicle, acquires traceability information of a device that is associated with the device request specification, specifies a regulation ID corresponding to the device request specification that is associated with the acquired traceability information, generates approval software inquiry information that is information in which the specified regulation ID is associated with one or more software IDs included in the traceability information, and generates vehicle traceability information that is information in which the approval software inquiry information is associated with the traceability information.

15 Claims, 12 Drawing Sheets

(51) Int. Cl.
*G06F 8/71* (2018.01)
*G06Q 30/018* (2023.01)
*G06Q 50/18* (2012.01)

(52) U.S. Cl.
CPC ......... *G06Q 50/18* (2013.01); *G06Q 2220/00* (2013.01)

(58) Field of Classification Search
CPC ......... G06F 8/60; G06F 21/57; G06Q 30/018; G06Q 50/18; G06Q 2220/00
See application file for complete search history.

(56) References Cited

FOREIGN PATENT DOCUMENTS

EP 3605320 A1 2/2020
JP 2005-173761 A 6/2005

OTHER PUBLICATIONS

Chinese Office Action dated Apr. 29, 2023 for Chinese Patent Application No. 202110658260.8.

* cited by examiner

APPROVAL SOFTWARE INQUIRY INFORMATION 21

| D211 REGULATION ID | D212 SOFTWARE INQUIRY NUMBER | D213 SOFTWARE ID | D214 VERIFICATION DATA | |
|---|---|---|---|---|
| R7902 | R7902001 | ECU A v1.0<br>ECU B v1.0<br>ECU C v1.0 | VERIFICATION DATA A v1.0<br>VERIFICATION DATA B v1.0<br>VERIFICATION DATA C v1.0 | D21A |
| R13H | R13H001 | ECU C v1.0 | VERIFICATION DATA C v1.0 | D21B |
| ⋮ | ⋮ | ⋮ | ⋮ | |

VEHICLE CONFIGURATION INFORMATION 24

FIG. 4

TRACEABILITY INFORMATION 20

| | |
|---|---|
| SREQ4 v1.0 | REQ A-1 v1.0<br>REQ A-2 v1.0<br>REQ B-2 v1.0<br>REQ B-3 v1.0<br>REQ C-1 v1.0<br>REQ C-2 v1.0 |
| ⋮ | ⋮ |

TRACEABILITY INFORMATION 30

| | |
|---|---|
| FUNC A-1 v1.0 | DSN A-1 v1.0<br>DSN A-3 v1.0 |
| ⋮ | ⋮ |

TRACEABILITY INFORMATION 30'

SOFTWARE INQUIRY INFORMATION MANAGEMENT SYSTEM AND SOFTWARE INQUIRY INFORMATION MANAGEMENT METHOD

CROSS-REFERENCE TO RELATED APPLICATIONS

This application claims priority pursuant to Japanese patent application No. 2020-103624, filed on Jun. 16, 2020, the entire disclosure of which is incorporated herein by reference.

BACKGROUND

Technical Field

The present invention relates to a software inquiry information management system and a software inquiry information management method.

Related Art

JP-A-2005-173761 discloses a vehicle design support device configured to solve a problem that work of checking whether a design matches a legal restriction in a design process of a vehicle requires a large amount of labor. The vehicle design support device includes: a legal restriction information storage unit configured to store information on a legal restriction related to a member attached to a vehicle for each member; a unit configured to input vehicle shape information defining a shape of the vehicle; a unit configured to input member shape information defining a shape of the member attached to the vehicle and an attachment position of the member; a determination unit configured to read member related legal restriction information related to the member from the legal restriction information storage unit and determine whether the member satisfies a regulation condition included in the member related legal restriction information; and an output unit configured to change a display format of the member according to a determination result of the determination unit and display the member.

In recent years, with a progress of wireless communication technology, a vehicle provider such as an automobile manufacturer can incorporate or update software (performance change, function change, function addition, or the like) in a device such as an electronic control unit (ECU) mounted on the vehicle via an over the air (OTA) at the time of manufacturing the vehicle or after sales of the vehicle. Accordingly, the vehicle provider can develop, produce, and sell an automobile in anticipation of future addition of an automated driving function, for example, and it is considered that an opportunity to update software installed in the vehicle will rapidly increase in the future.

In view of such a situation, international standards have been developed for software update in World Forum for Harmonization of Vehicle Regulations (WP29). The WP29 has been investigated in institutionalization on issues of, for example, evaluating an influence of software update on type authentication of a vehicle and converting a result of the evaluation into a document, giving a report to authorities (Ministry of Land, Infrastructure, Transport and Tourism, and the like) when the software update influences content of the type approval that has already been received, introducing a concept (hereinafter, referred to as a "software inquiry number") defining a number in which one or more pieces of software incorporated in an in-vehicle system under type authorization are classified and aggregated on a version level, and submitting information such as evidence related to the software update in response to a request from the authorities.

When the above-described institution is started, it is necessary for the vehicle provider to efficiently and reliably perform, for a large number of devices mounted on the vehicle, assignment of a software inquiry number based on the software incorporated in the devices, analysis of the influence on the type approval when the software is updated, acquisition of the evidence or the like that needs to be reported regarding the type approval, and the like.

However, most of the devices mounted on the vehicle are usually supplied from a device supplier such as a supplier to the vehicle provider (OEM), and information related to software such as traceability information is managed on a supplier side. When dealing with the above-described institution, it is expected that complicated work for associating information such as the type approval managed on a provider side of the vehicle with information related to software will occur. In JP-A-2005-173761 described above, it is determined whether the member attached to the vehicle satisfies the regulation condition included in member related method legal restriction information, but nothing is disclosed regarding a technique of integrally managing information managed on a supplier side of a device and information managed on a provider side of a vehicle.

SUMMARY

The invention has been made in view of such a background, and an objective of the invention is to provide a software inquiry information management system and a software inquiry information management method that are capable of efficiently managing information related to legal approval of software. The software is incorporated in a device mounted on a vehicle.

In order to achieve the above-described objective, one aspect of the invention is an information processing system configured to manage information related to legal approval of software for implementing a function of a device mounted on a vehicle. The information processing system is configured to store a device request specification in association with a regulation ID, the regulation ID being information specifying a regulation that defines a requirement for receiving legal approval for a vehicle, the device request specification being information related to a specification requested by the regulation for the device, acquire traceability information that is information related to traceability of the device, the traceability being associated with the device request specification, the traceability information including a software ID that specifies software to be incorporated into the device, and generate a software inquiry number that is information in which the regulation ID corresponding to the device request specification associated with the acquired traceability information is associated with one or more software IDs.

Other problems disclosed by the present application and methods for solving such problems will become apparent based on the description of embodiment and drawings.

According to the invention, it is possible to efficiently manage information related to legal approval of software. The software is incorporated in a device mounted on a vehicle.

BRIEF DESCRIPTION OF DRAWINGS

FIG. 4 shows an example of traceability information managed by a device supplier and a vehicle provider.

DESCRIPTION OF EMBODIMENTS

Figure 1:
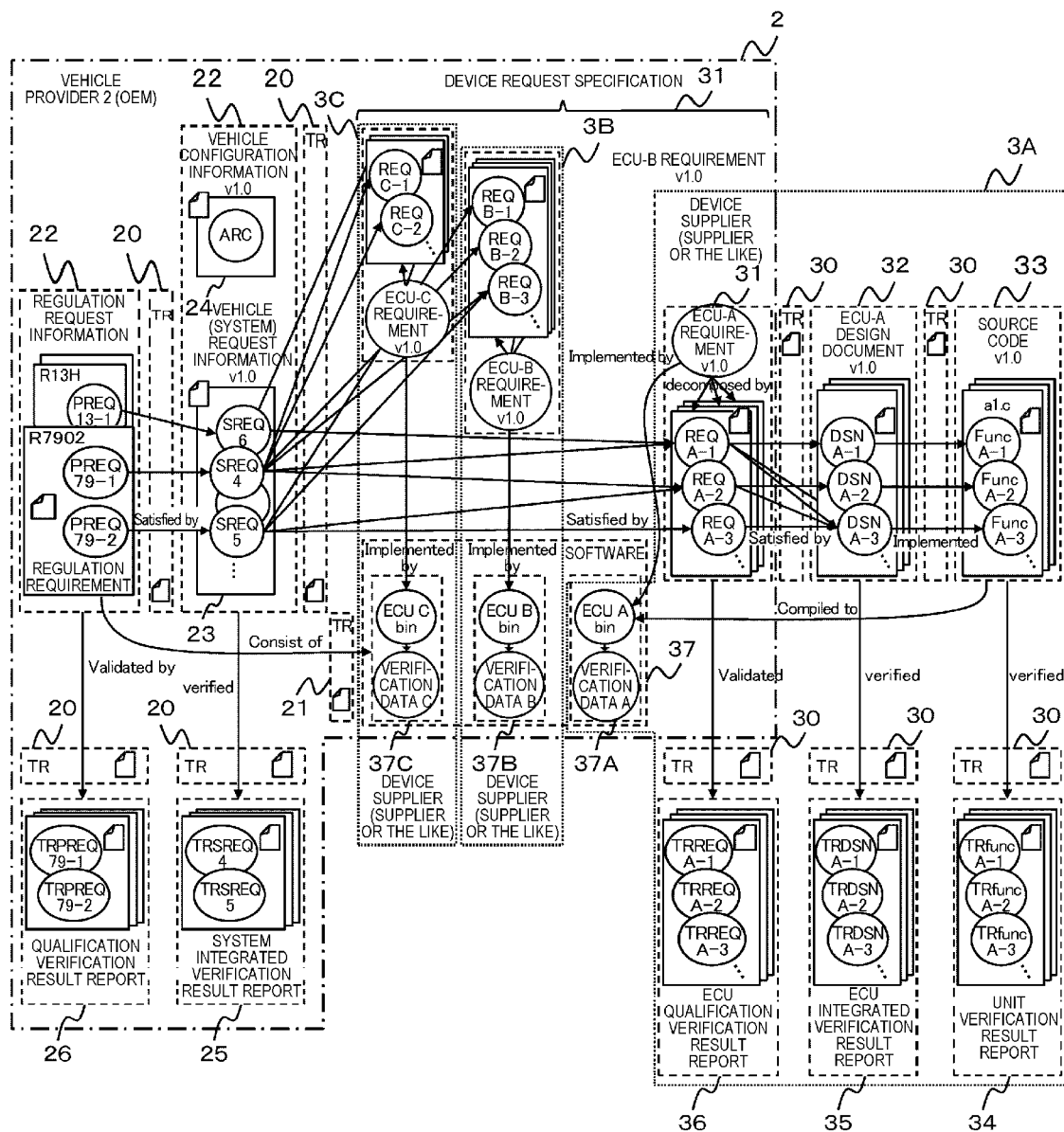
FIG. 1 is a diagram showing a relationship between information related to approval of a vehicle type and software information.

Hereinafter, an embodiment of the invention will be described with reference to the drawings. In the following description, the same or similar components are denoted by the common reference numerals, and a repetitive description thereof may be omitted.

In the following description, "regulations" refer to ordinances (laws, government ordinances, rules, and the like) that need to be observed in order to receive authentication as to whether a vehicle satisfies safety standards such as type approval. The regulations are not limited to those in Japan, and include regulations in an export destination (destination country) of a vehicle.

In the following description, "software" refers to a control command written in an electronic control unit (ECU) and data necessary for executing the control command.

In the following description, "incorporating software into a device" refers to recording (storing, writing, downloading, or the like) software in a storage element of a device. "Managing information" refers to storing (memorizing) information in a database or the like and managing the information in a state in which operations such as search, update, and deletion can be performed.

In the following description, "traceability" may be abbreviated as "trace". In the following description, "evidence" refers to related materials such as test results and review results that a vehicle provider submits to authorities (Ministry of Land, Infrastructure, Transport and Tourism, or the like) for the type approval or the like.

In the following description, a provider of a vehicle (a vehicle manufacturer such as an automobile manufacturer) is referred to as a "vehicle provider". A supplier of a device (ECU or the like) mounted on a vehicle, a server device cooperating with the vehicle at an outside of the vehicle, or the like is referred to as a "device supplier". However, both the vehicle provider and the device supplier are defined for convenience of the description, and a management entity and an operation entity of various kinds of configurations described below are not necessarily limited.

In the following description, information for which a creation subject is not particularly specified is set by, for example, an input operation of a user or a present information processing system.

Software Inquiry Information

Information (hereinafter, referred to as "software inquiry information 6") that is managed by the vehicle provider or the device supplier and is related to software will be described. The software is incorporated in a device such as an ECU mounted on a vehicle.

FIG. 1 is a diagram showing the software inquiry information 6. As shown in FIG. 1, the software inquiry information 6 includes approval software inquiry information 21, regulation request information 22, a vehicle request specification 23, a system integrated verification result report 25, a qualification verification result report 26, a device request specification 31, software 37, and traceability information 20, which are pieces of information managed on a vehicle provider 2 side. The software inquiry information 6 includes the device request specification 31, a design document 32, a source code 33, a unit verification result report 34, an ECU integrated verification result report 35, an ECU qualification verification result report 36, the software 37, and traceability information 30, which are pieces of information managed on device suppliers 3A to 3C sides. The software inquiry information 6 is managed for each fixed group such as a model of a vehicle. In the present embodiment, it is assumed that the software inquiry information 6 is managed for each model.

The approval software inquiry information 21 is information indicating a correspondence between a regulation that receives approval and software related to the approval.

Figures 2, 3:
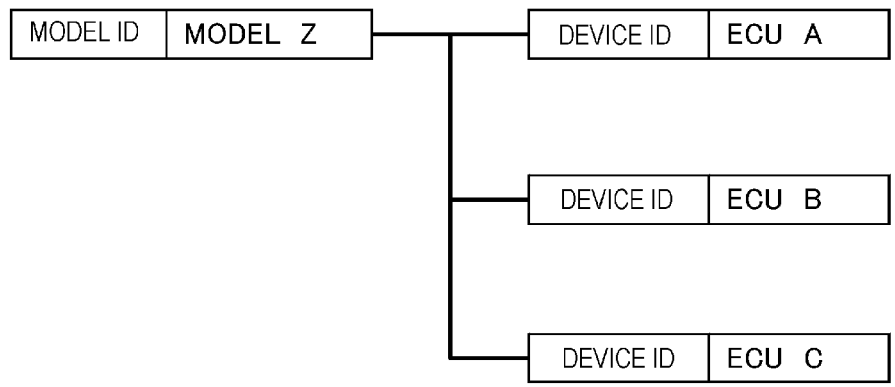
FIG. 2 is a diagram showing an example of a configuration of software inquiry information.
FIG. 3 shows an example of vehicle configuration information.

FIG. 2 is a diagram showing the approval software inquiry information 21. The approval software inquiry information 21 includes information in which a regulation ID (D211), a software inquiry number (approval identifier) D212, a software ID (D213), and verification data D214 are associated with one another. The regulation ID (D211) is an identifier of a regulation. The software inquiry number (approval identifier) D212 is an identifier (identifier for distinguishing the approval) newly given each time a regulation is approved by updating software or the like. The software ID (D213) is an identifier of the software. The verification data D214 is data for verifying integrity of binary data indicated by the software ID (D213). Here, the software ID includes information (an ID for identifying an ECU, a name of a module, and the like) for specifying a type of software and version information of the software. Note that the software ID may include only version information, and the information for specifying the type of the software may be managed separately. As described above, since the approval software inquiry information 21 includes a combination of the regulation ID, the software inquiry number, and one or more software IDs (name+version information), the software inquiry information 6 can be managed by distinguishing the software at a version level.

In FIG. 2, the regulation ID (D211) of a record of D21A is set to "R7902" indicating a second series of Agreement Rule number 79 (unified provision related to approval of vehicles according to steering devices). The record indicates that "R7902001" is set as the software inquiry number D212 indicating a combination of the software constituting a function of the regulation, and combinations of the software IDs constituting the record are "ECU A v1.0", "ECU B v1.0", and "ECU C v1.0".

Referring back to FIG. 1, the regulation request information 22 includes information that indicates content requested by the regulation in the approval. FIG. 1 shows that "PREQ79-1" and "PREQ79-2" are present as the regulation request information 22 for conforming to "R7902". These correspond to requirements of, for example, "giving an optical warning when a driver does not hold a steering control after a maximum of 15 seconds elapse" and "giving an acoustic warning in addition to the above-described warning when a driver does not hold a steering control after a maximum of 30 seconds elapse".

The vehicle request specification 23 includes information indicating request specifications of a vehicle system derived from regulations and other requests. FIG. 1 shows that "SREQ4" and "SREQ5" are present as the vehicle request specification 23. These correspond to the requirements of, for example, "giving an optical warning when a driver does not hold a steering control after a maximum of 15 seconds elapse" and "giving an acoustic warning in addition to the above-described warning when a driver does not hold a steering control after a maximum of 30 seconds elapse". The requirements are derived from the above-mentioned regulation requests. The vehicle configuration information 24 includes information such as architecture, an ECU configuration, and a model for constituting the vehicle system.

FIG. 3 shows an example of information included in the vehicle configuration information 24. The exemplified vehicle configuration information 24 has a structure in which a model ID is used as a route, and device IDs are managed hierarchically (in a tree form). The model ID is an identifier given to each model of a vehicle. The device IDs are an identifier of a device mounted on the vehicle. According to the exemplified vehicle configuration information 24, the model ID and the device IDs constituting a model of the model ID can be associated with each other. Since the model ID and the device IDs are normally given to information (the device request specification 31, the design document 32, and the like) managed by the device suppliers 3A to 3C, these pieces of information can be associated with the vehicle configuration information 24.

Referring back to FIG. 1, the system integrated verification result report 25 includes various kinds of information (a test specification document, a test result report, and the like) related to verification of design content defined by the vehicle request specification 23 and the vehicle configuration information 24. FIG. 1 shows that "TRSREQ 4", "TRSREQ 5", and the like are present as the system integrated verification result report 25.

The qualification verification result report 26 includes various kinds of information (a test specification document, a test result report, and the like) related to qualification verification of functions defined by the regulation request information 22. FIG. 1 shows that "TRPREQ 79-1", "TRPREQ 79-2", and the like are present as the qualification verification result report 26.

The device request specification 31 includes information indicating content of a request for a specification of a device mounted on a vehicle based on the vehicle request specification 23 and the vehicle configuration information 24. FIG. 1 shows that "REQ A-1", "REQ A-2", "REQ A-3" and the like are present as the device request specification 31 of an ECU A. These correspond to, for example, "detection (15 seconds)", "detection (30 seconds)", and "notification to an ECU B" which are derived from the "SREQ4" of the vehicle request specification 23 described above. FIG. 1 also shows that device request specifications for the ECU B and an ECU C are present in order to implement the vehicle request specification 23. The device request specification 31 is defined by the vehicle provider 2 and disclosed to the device supplier. Entire requirements for the ECU (for example, "ECU A requirement v1.0") are a combination of these device request specifications ("REQ A-1", "REQ A-2", and "REQ A-3"). Software presented from the device supplier 3 to the vehicle provider 2 is managed in association with a corresponding request. For example, when software to be provided is one piece of binary data, the binary data is associated with the entire requirements for the ECU.

The design document 32 includes various kinds of information (abasic design document, a detailed design document, a test specification document, a test result, and the like) related to a design of a device. FIG. 1 shows that design content including "DSN A-1", "DSN A-2", "DSN A-3", and the like are managed as the design document 32 of the ECU.

The source code 33 is a source code of software incorporated in a device. FIG. 1 shows that a source code "a1.c" or the like including a plurality of functions, classes ("Func A-1", "Func A-2", and "Func A-3"), or the like is managed as the source code 33.

The unit verification result report 34 includes various kinds of information (a test specification document, a test result report, and the like) related to verification of a function level. FIG. 1 shows that "TRfunc A-1", "TRfunc A-2", "TRfunc A-3", and the like are present as the unit verification result report 34.

The ECU integrated verification result report 35 includes various kinds of information (a test specification document, a test result report, and the like) related to verification of the design content defined by the design document 32. FIG. 1 shows that "TRDSN A-1", "TRDSN A-2", "TRDSN A-3", and the like are present as the ECU integrated verification result report 35.

The ECU qualification verification result report 36 includes various kinds of information (a test specification document, a test result report, and the like) related to qualification verification of functions defined by the device request specification 31. FIG. 1 shows that "TRREQ A-1", "TRREQ A-2", "TRREQ A-3", and the like are present as the ECU qualification verification result report 36.

The software 37 includes software created based on the device request specification 31. The software is created by the device supplier 3 and provided to the vehicle provider 2. The software includes a binary code in which a control command is described, data (calibration data or the like) used for executing the control command, and verification data for verifying integrity of the binary code and the data. The software 37 is generated by compiling the source code 33 of the device supplier 3.

The traceability information 20 is association information between deliverables created and managed by the vehicle provider. The traceability information 20 includes an association between the regulation request information 22 and the vehicle request specification 23, an association between the vehicle request specification 23 and the device request specification 31, an association between the regulation request information 22 and the qualification verification result report 26, an association between the vehicle request specification 23 and the qualification verification result report 26, and the like.

The traceability information 30 is information that associates deliverables created and managed by the device supplier 3. The traceability information 30 includes an association between the device request specification 31 and the design document 32, an association between the design document 32 and the source code 33, an association between the source code 33 and the unit verification result report 34, an association between the design document 32 and the ECU integrated verification result report 35, an association between the device request specification 31 and the ECU qualification verification result report 36, an association between the device request specification 31 and the software 37, and the like.

FIG. 4 shows an example (traceability information 20, 30) of the traceability information. For example, the traceability information 20 shown in FIG. 4 indicates the association between the vehicle request specification 23 and the device request specification 31, and a record denoted by a reference numeral 20a indicates that a vehicle request specification "SREQ4 v1.0" is satisfied by device request specifications "REQ A-1 v1.0", "REQ A-2 v1.0", "REQ B-2 v1.0", "REQ B-3 v1.0", "REQ C-1 v1.0", and "REQ C-2 v1.0". The traceability information 30 shown in FIG. 4 indicates the association between the design document 32 and the source code 33, and a record denoted by a reference numeral 30a indicates that a design "DSN A-1 v1.0" is implemented by a function "FUNC A-1 v1.0". In the traceability information 20, IDs are given to the request specifications or the like, and an association between IDs is indicated. Examples of expression of such traceability information include the tabular form shown in FIG. 4.

The information shown in FIG. 1 is managed, for example, in units of vehicle models. An example 3A of the management information of the device supplier 3 of the ECU A is described in FIG. 1. However, the device request specification 31, the design document 32, the source code 33, the unit verification result report 34, the ECU integrated verification result report 35, the ECU qualification verification result report 36, and the software 37 are created and managed by each device supplier 3. For example, the device suppliers 3 of the ECU B and the ECU C manage information 3B and information 3C, respectively.

Software Inquiry Information Management System

Next, an information processing system (hereinafter, referred to as a "software inquiry information management system 1") according to an embodiment will be described.

Figure 5:
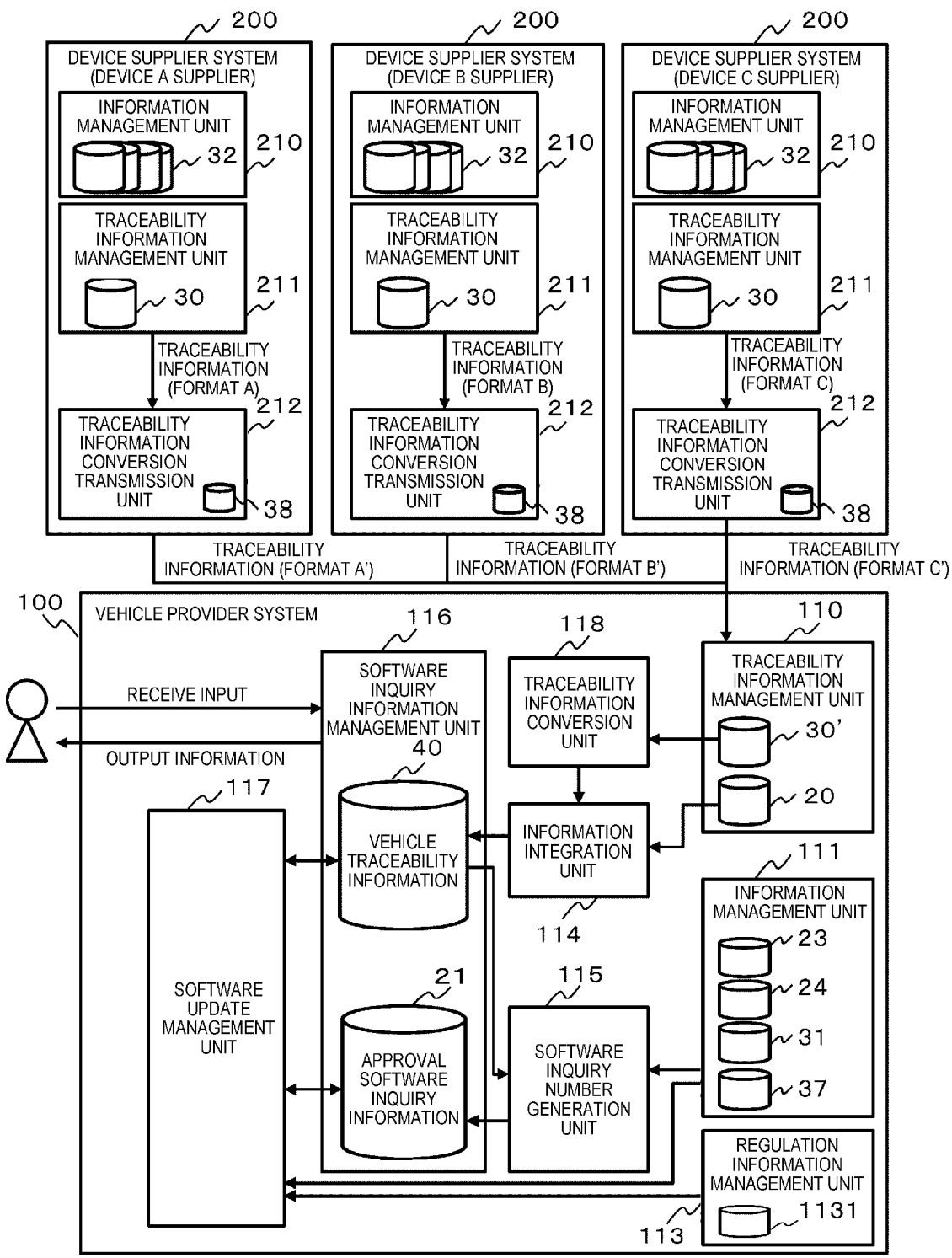
FIG. 5 is a diagram showing a schematic configuration of a software inquiry information management system.

FIG. 5 shows a schematic configuration of the software inquiry information management system 1. The software inquiry information management system 1 is a system that manages the software inquiry information 6, and includes a vehicle provider system 100 that is an information processing system managed on the vehicle provider 2 side, and one or more device supplier systems 200 that are information processing systems managed on the device suppliers 3A to 3C sides.

Each of the vehicle provider system 100 and the device supplier system 200 is constituted using one or more information processing devices. The device supplier system 200 and the vehicle provider system 100 are communicably connected to each other via a communication network (such as a wide area network (WAN), a local area network (LAN), the Internet, a dedicated line, and various public communication networks).

Figure 6:
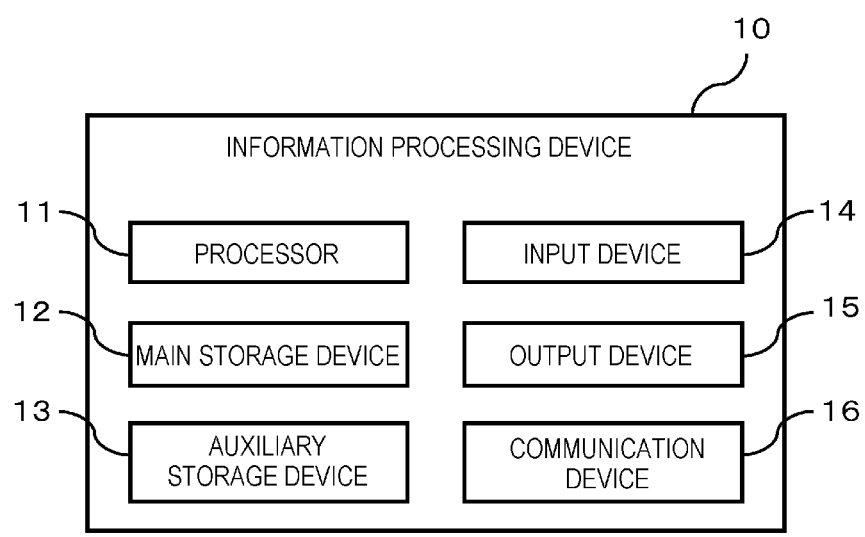
FIG. 6 shows an example of an information processing device constituting a device supplier system or a vehicle provider system.

FIG. 6 shows an example of a hardware configuration of the information processing device (computer) constituting the vehicle provider system 100 or the device supplier system 200. As shown in FIG. 6, the exemplified information processing device 10 includes a processor 11, a main storage device 12, an auxiliary storage device 13, an input device 14, an output device 15, and a communication device 16. These devices are communicably connected to one another via a communication unit such as a bus (not shown).

For example, an operating system, a device driver, a file system, a database management system (DBMS) (relational database, NoSQL, or the like) or the like may be introduced into the information processing device 10.

The information processing device 10 is, for example, a desktop personal computer, an office computer, a mainframe, a mobile communication terminal (a smartphone, a tablet, a wearable terminal, a notebook personal computer, or the like).

For example, the information processing device 10 may be implemented using virtual information processing resources such as a cloud server provided by a cloud system, and the vehicle provider system 100 and the device supplier system 200 may be provided as cloud services.

The processor 11 is constituted using, for example, a central processing unit (CPU), a micro processing unit (MPU), a graphics processing unit (GPU), an artificial intelligence (AI) chip, a field programmable gate array (FPGA), and an application specific integrated circuit (ASIC).

The main storage device 12 is a device that stores programs and data, and is, for example, a read only memory (ROM), a random access memory (RAM), or a non-volatile memory (non-volatile RAM (NVRAM)).

The auxiliary storage device 13 is, for example, a read and write device of a recording medium such as a solid state drive (SSD), a hard disc drive, an optical storage device (such as a compact disc (CD) and a digital versatile disc (DVD)), a storage system, an IC card, an SD card, or an optical recording medium, and a storage domain of a cloud server. Programs and data can be read into the auxiliary storage device 13 via a read device of a recording medium or the communication device 16. The programs and data that are stored (memorized) in the auxiliary storage device 13 are read into the main storage device 12 at any time.

The input device 14 is an interface that receives an input from an outside, and is, for example, a keyboard, a mouse, a touch panel, a card reader, or a voice input device.

The output device 15 is an interface that outputs various kinds of information such as a processing process or a processing result. The output device 15 is, for example, a display device (such as a liquid crystal monitor, a liquid crystal display (LCD), and a graphic card) that visualizes the above-described various kinds of information, a device (sound output device (such as a speaker)) that vocalizes the above-described various kinds of information, or a device (such as a printing device) that converts the above-described various kinds of information into characters. The output device 15 constitutes a user interface together with the input device 14.

For example, the information processing device 10 may input and output information to and from another device (a smartphone, a tablet, a notebook computer, various portable information terminals, or the like) via the communication device 16.

The communication device 16 implements communication with other devices. The communication device 16 is a wired or wireless communication interface that implements communication with other devices via a communication network 5, and is, for example, a network interface card (NIC), a wireless communication module, a universal serial bus (USB) module, or a serial communication module.

Referring back to FIG. 5, functions of each system will be described. The vehicle provider system 100 includes a traceability information management unit 110, an information management unit 111, a regulation information management unit 113, a traceability information conversion unit 118, an information integration unit 114, a software inquiry number generation unit 115, a software inquiry information management unit 116, and a software update management unit 117. These functions are implemented by the processor 11 of the information processing device 10 constituting the vehicle provider system 100 reading and executing programs stored in the main storage device 12, or by the hardware (FPGA, ASIC, AI chip, or the like) of the information processing device 10.

The traceability information management unit 110 receives and manages traceability information 30', which will be described later, transmitted from the device supplier system 200. The traceability information management unit 110 manages the traceability information 20 generated by the vehicle provider shown in FIG. 1.

The information management unit 111 manages the vehicle request specification 23, the vehicle configuration information 24, the device request specification 31, the software 37, the system integrated verification result report 25 (not shown in FIG. 5), and the qualification verification result report 26 (not shown in FIG. 5) which are shown in FIG. 1. The information management unit 111 may be separately managed by a plurality of engineering tools, or may be integrally managed by one engineering tool. That is, it is sufficient that necessary information can be referred to when necessary.

Referring back to FIG. 5, the regulation information management unit 113 manages information (hereinafter, referred to as "regulation information 1131") related to a regulation applied at the time of approval of a vehicle type. The regulation information 1131 includes the regulation request information 22, a template of a document to be reported to authorities, a reported document, and the like. The regulation information management unit 113 manages regulation information of not only Japan but also an export destination (destination country) of a vehicle other than Japan. Based on the regulation information of the export destination specified by destination country information, information necessary for acquiring the approval of the type at the export destination can be obtained.

The traceability information conversion unit 118 reads the traceability information 30' created in a format created by the device supplier, and converts the traceability information 30' into a common format that can be used by the vehicle provider. Here, a resource description framework (RDF) or the like can be applied as a common expression format for expressing the traceability information.

The information integration unit 114 associates information (information managed by each of the information management unit 111 and the regulation information management unit 113) managed in each of the vehicle provider system 100 and the device supplier system 200 based on the traceability information 30' converted into the common format and the traceability information 20, thereby generating vehicle traceability information 40. In the vehicle traceability information 40, a regulation ID is associated with information in which the regulation request information 22, the vehicle request specification 23, the device request specification 31, the design document 32, the source code 33, and the regulation request information 22 are associated with one another. In this way, by commonly managing the traceability information in the RDF format, a query language such as protocol and RDF query language (SPARQL) can be used, and it is easy to search for related information.

The software inquiry number generation unit 115 generates the approval software inquiry information 21 based on the vehicle traceability information 40.

The software inquiry information management unit 116 manages the vehicle traceability information 40 generated by the information integration unit 114 in association with the approval software inquiry information 21 (corresponding to the approval software inquiry information 21 in FIG. 1) generated by the software inquiry number generation unit 115.

The software update management unit 117 performs a process related to updating the approval software inquiry information 21 and the like when the software incorporated in the device mounted on the vehicle is updated. The software update management unit 117 receives key information (for example, an identifier (hereinafter, referred to as a "function ID") of a function or a class described in a source code or a regulation ID) or the like for designating software from the user, specifies the software inquiry information 6 that includes the source code including the received key information, and provides the user with information related to the specified software inquiry information 6. By referring to the above-described information, the user can easily and quickly obtain, for example, information related to a target (software, a device, regulations, or the like) that needs to be approved again and a test (verification) that is necessary to receive approval.

Next, functions of the device supplier system 200 shown in FIG. 5 will be described. As shown in FIG. 5, the device supplier system 200 includes an information management unit 210, a traceability information management unit 211, and a traceability information conversion transmission unit 212. These functions are implemented by the processor 11 of the information processing device 10 constituting the device supplier system 200 reading and executing the programs stored in the main storage device 12, or by the hardware (FPGA, ASIC, AI chip, or the like) of the information processing device 10.

The information management unit 210 shown in FIG. 5 manages deliverables of the device request specification 31, the design document 32, the source code 33, the unit verification result report 34, the ECU integrated verification result report 35, the qualification verification result report 36, the software 37, and the like (only a part is shown) that are shown in FIG. 1. The information management unit 210 may be separately managed by a plurality of engineering tools, or may be integrally managed by one engineering tool, and it is sufficient that necessary information can be referred to when necessary.

The traceability information management unit 211 manages the traceability information 30 shown in FIG. 1.

The traceability information conversion transmission unit 212 transmits the traceability information 30 managed by the traceability information management unit 211 to the vehicle provider system 100. At this time, among the traceability information (traceability information 30) managed on a device supplier 3 side, information (for example, a portion (a function name or the like) that is desired to be concealed in the source code) that is desired to be concealed on the device suppliers 3A to 3C sides may be converted (encrypted or replaced with another code) and transmitted to the vehicle provider system 100 as the traceability information 30'. By converting the information in this manner, it is possible to generate traceability information from a request to the source code while keeping the information of the device supplier 3 concealed. When the conversion is performed, a conversion table 38 of the traceability information 30 and the traceability information 30' is generated and saved. When the device supplier 3 is requested to provide information from the vehicle provider 2, the device supplier 3 inversely converts data using the conversion table 38 and refers to necessary data.

Description of Process

Next, a process performed in the software inquiry information management system 1 will be described.

Generation Process of Software Inquiry Information

Figure 7:
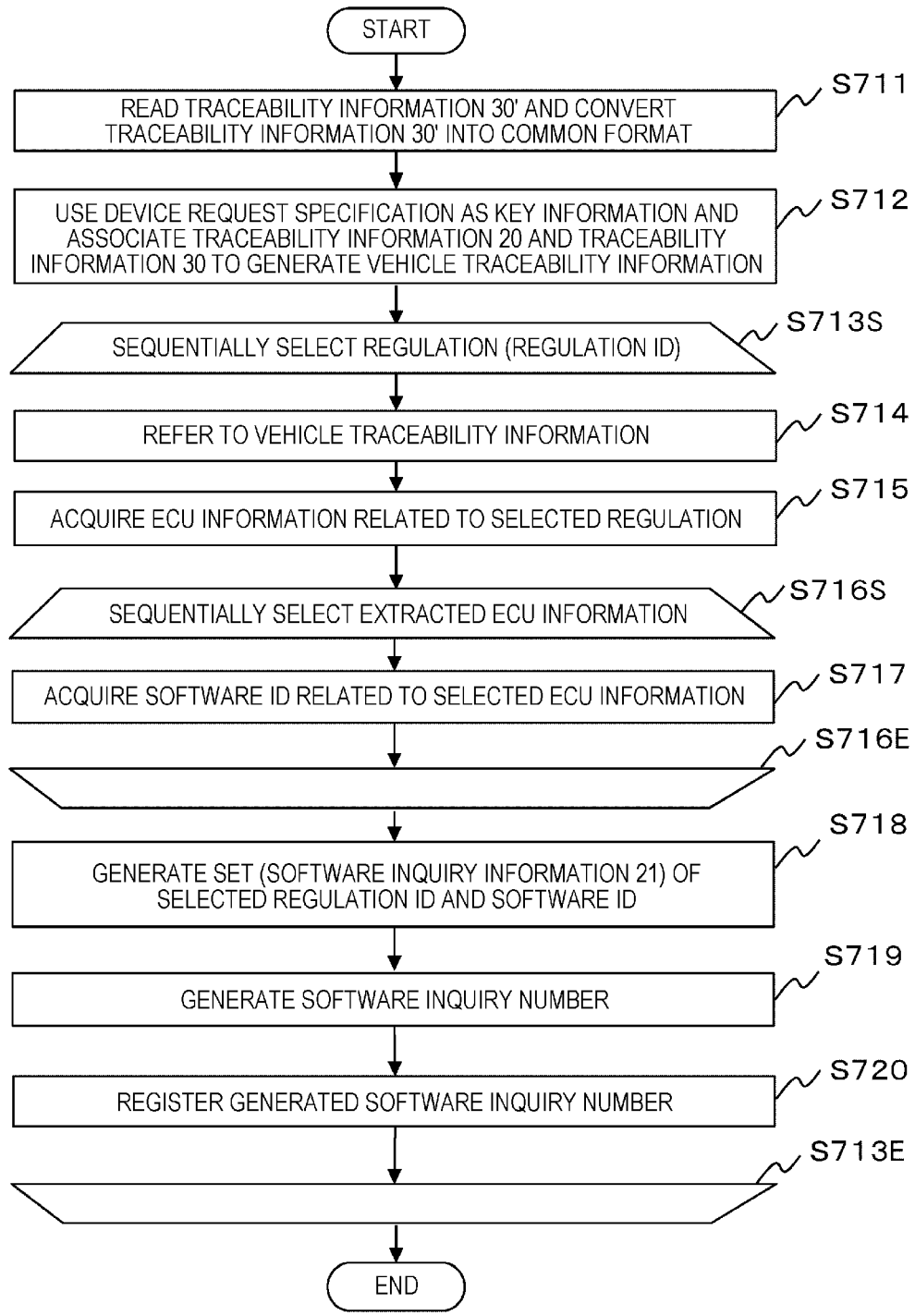
FIG. 7 is a flowchart showing a software inquiry number generation process.

FIG. 7 is a flowchart showing a process (hereinafter, referred to as a "software inquiry information generation process S700") performed in the vehicle provider system 100 when the software inquiry information 6 is generated. Hereinafter, the software inquiry information generation process S700 will be described with reference to FIG. 7. At a start of the software inquiry information generation process S700, the traceability information management unit 110 manages the traceability information 20 (traceability information generated by the vehicle provider) and the traceability information 30' (traceability information 30' acquired from the device supplier system 200). At the start, the information management unit 111 manages information such as the vehicle request specification 23 and the device request specification 31. At the start, the regulation information management unit 113 manages the regulation information 1131 set in advance by the user or the like.

As shown in FIG. 7, first, the traceability information conversion unit 118 reads the traceability information 30' that is created in the format created by the device supplier, and converts the traceability information 30' into the common format (S711).

Figure 8:
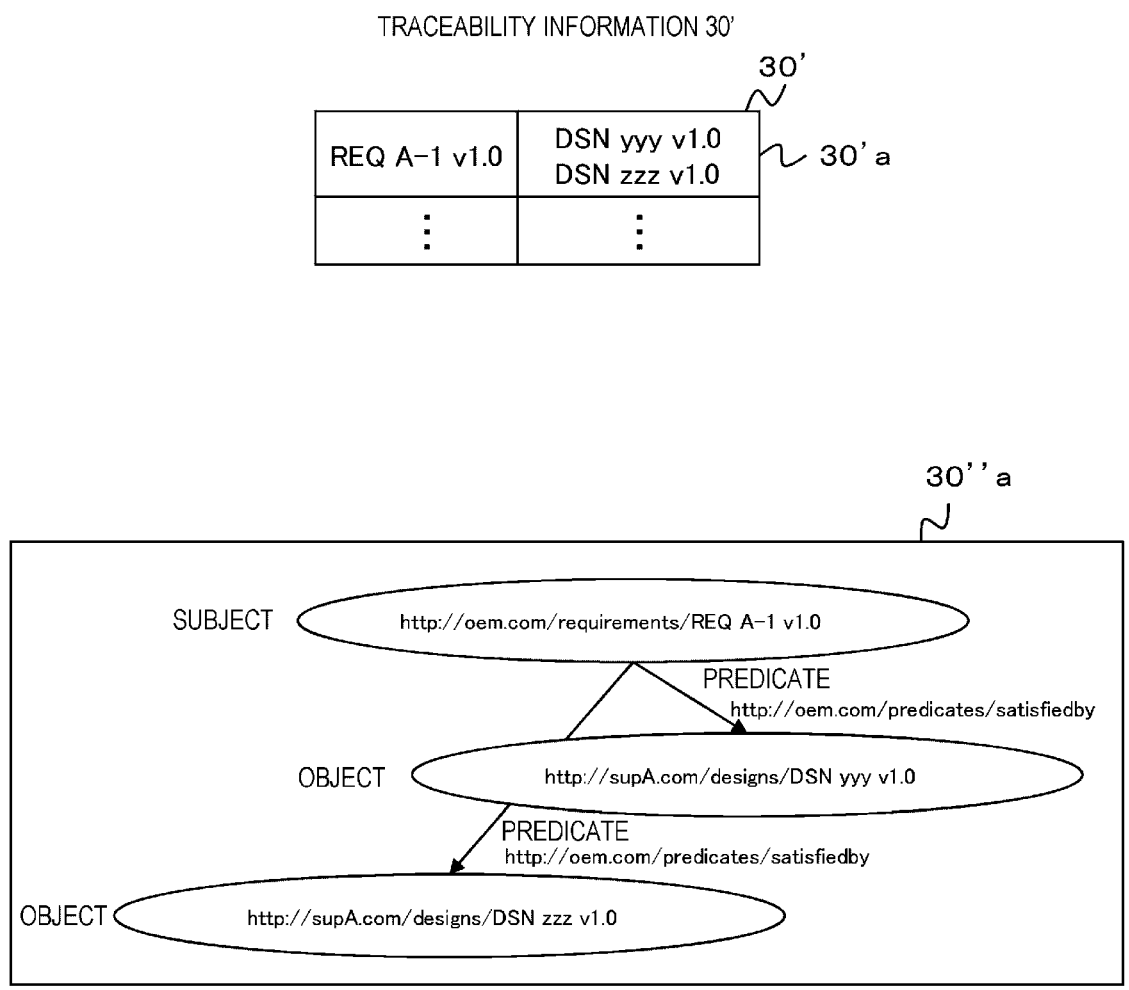
FIG. 8 shows an example of traceability information managed by the vehicle provider.

FIG. 8 is a diagram showing the traceability information 30' and conversion thereof. The traceability information 30' is obtained by the traceability information conversion transmission unit 212 converting the traceability information 30. Traceability information 30'a indicates that the device request specification "REQ A-1 v1.0" is satisfied by a design "DSN yyy v1.0" and a design "DSN zzz v1.0". Here, "DSN yyy v1.0" and "DSN zzz v1.0" are expressions after the conversion performed by the traceability information conversion transmission unit 212. Traceability information 30" is information in the common format obtained by conversion performed by the traceability information conversion unit 118. When the RDF is used, the information is expressed by a sentence including a subject, a predicate, and an object, and in the traceability information 30", "REQ A v1.0" is the subject, the design "DSN yyy v1.0" and the design "DSN zzz v1.0" are the objects, and "satisfied by" indicating that "REQ A v1.0" is satisfied by the design "DSN yyy v1.0" and the design "DSN zzz v1.0" is the predicate. In the RDF, these pieces of information are expressed by a uniform resource identifier (URI). In this way, by commonly managing the traceability information in the RDF format, the query language such as the SPARQL can be used, and it is easy to search for related information.

Referring back to FIG. 7, next, the information integration unit 114 associates the information (information managed by each of the information management unit 111 and the regulation information management unit 113) managed in each of the vehicle provider system 100 and the device supplier system 200 based on the traceability information 30" converted into the common format and the traceability information 20, thereby generating the vehicle traceability information 40. In the vehicle traceability information 40, the regulation ID is associated with information in which the regulation request information 22, the vehicle request specification 23, the device request specification 31, the design document 32, the source code 33, the software 37, and the regulation request information 22 are associated with one another (S712).

In subsequent loop processes S713S to S713E, the software inquiry number generation unit 115 generates the approval software inquiry information 21. The software inquiry number generation unit 115 sequentially selects a regulation (regulation ID) of the regulation information 1131 managed by the regulation information management unit 113 in each loop.

In the above-described loop processes S713S to S713E, first, the software inquiry number generation unit 115 compares the selected regulation with the vehicle traceability information 40 managed by the software inquiry information management unit 116 (S714), acquires an ECU related to the selected regulation via the vehicle request specification 23 and the device request specification 31, and extracts information of the software 37 in which the device request specification 31 is implemented. In a case where the regulation is related only to the hardware, the subsequent processes are not performed, and the process is ended (S715).

In loop processes S716S to S716E, the software inquiry number generation unit 115 sequentially selects the vehicle traceability information 40 that is extracted in S715 and is related to the selected regulation, and acquires the software ID included in the selected vehicle traceability information 40 (S717).

When the above-described loop processes S713S to S713E end, the software inquiry number generation unit 115 subsequently issues (assigns) a new software inquiry number for the selected regulation, and generates a set of the regulation ID of the selected regulation and the newly issued software inquiry number (S718).

Subsequently, the software inquiry number generation unit 115 generates the approval software inquiry information 21 by associating the set of the regulation ID generated in S717 and the software inquiry number with all the software IDs acquired in S717 (S719).

Subsequently, the software inquiry information management unit 116 associates all the vehicle traceability information 40 extracted in S715 with the approval software inquiry information 21 generated in S719 as targets to be managed (S720).

As described above, the vehicle provider system 100 can efficiently generate the vehicle traceability information 40 and the approval software inquiry information 21 based on the traceability information 30 transmitted from the device supplier system 200.

Update Process of Software Inquiry Information

Figure 9:
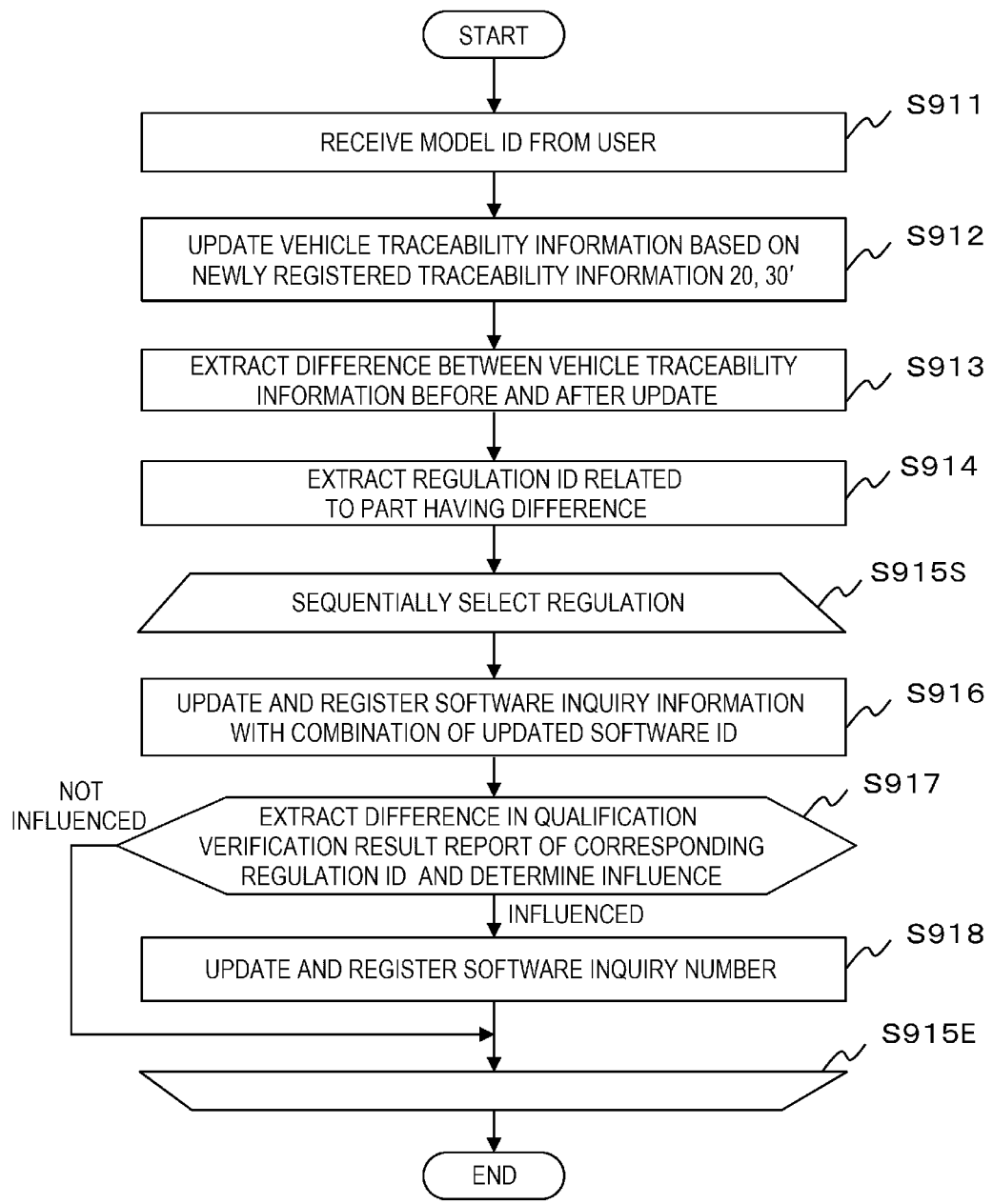
FIG. 9 is a flowchart showing a software update management process.

FIG. 9 is a flowchart showing a process (hereinafter, referred to as a "software update management process S900") performed by the software update management unit 117 of the vehicle provider system 100 when the software incorporated in the device is updated. Hereinafter, the software update management process S900 will be described with reference to FIG. 9. At a start of the software update management process S900, it is assumed that the traceability information 20 (traceability information generated by the vehicle provider) and the traceability information 30' (traceability information 30' acquired from the device supplier system 200) updated with the software update are registered in the traceability information management unit 110.

First, the software update management unit 117 receives a model ID from a user (S911).

Next, the software update management unit 117 updates the vehicle traceability information 40 using the newly registered traceability information 20, 30' via the traceability information conversion unit 118 and the information integration unit 114 (S912).

Next, the software update management unit 117 extracts a difference between the vehicle traceability information 40 before and after the update (S913). The difference is extracted based on a difference in version included in each element, or the like. Examples of the difference include that, for example, when a function is modified due to a failure or the like, a difference occurs in the source code 33, and thus this difference is extracted.

Next, the software update management unit 117 extracts a regulation ID related to an element of which the difference is detected (S914).

In subsequent loop processes S915S to S915E, the software update management unit 117 sequentially selects the extracted regulation IDs.

In the above-described loop processes, first, the software update management unit 117 updates and registers the software inquiry information using the updated software ID for the selected regulation ID (S916).

Next, the software update management unit 117 determines whether the update of the software influences approval content of the selected regulation ID (S917). When the update influences the approval content (S917: influenced), the process proceeds to S918. When the update does not influence the approval content (S917: not influenced), the process proceeds to S915E, a next regulation ID is selected, and the loop processes are performed (S915S to S915E). Here, the determination of the influence is performed by comparing specification information and a verification result that are acquired from the information management unit 111 based on the traceability information with content described in the reported document acquired from the regulation information management unit 113 and determining whether the contents of the reported document needs to be changed. That is, when the content of the reported document needs to be changed, it is determined that "the approval content is influenced", and when the content of the reported document does not need to be changed, it is determined that "the approval content is not influenced".

In S918, the software update management unit 117 updates and registers the software inquiry number of the selected regulation ID.

As described above, the user can efficiently grasp the software inquiry number that is related to the software update or needs to be updated.

In S918, for example, information that is included in the vehicle traceability information 40 associated with the approval software inquiry information acquired in S914 may be further presented. Accordingly, the user can refer to various pieces of information (the regulation request information 22, the vehicle request specification 23, the device request specification 31, the design document 32 (the basic design document, the detailed design document, the test specification document, the test result, and the like), the source code 33, and a submission document for approval) related to software requiring a test, and can efficiently proceed with test work.

Reference Process of Software Inquiry Information

Figure 10:
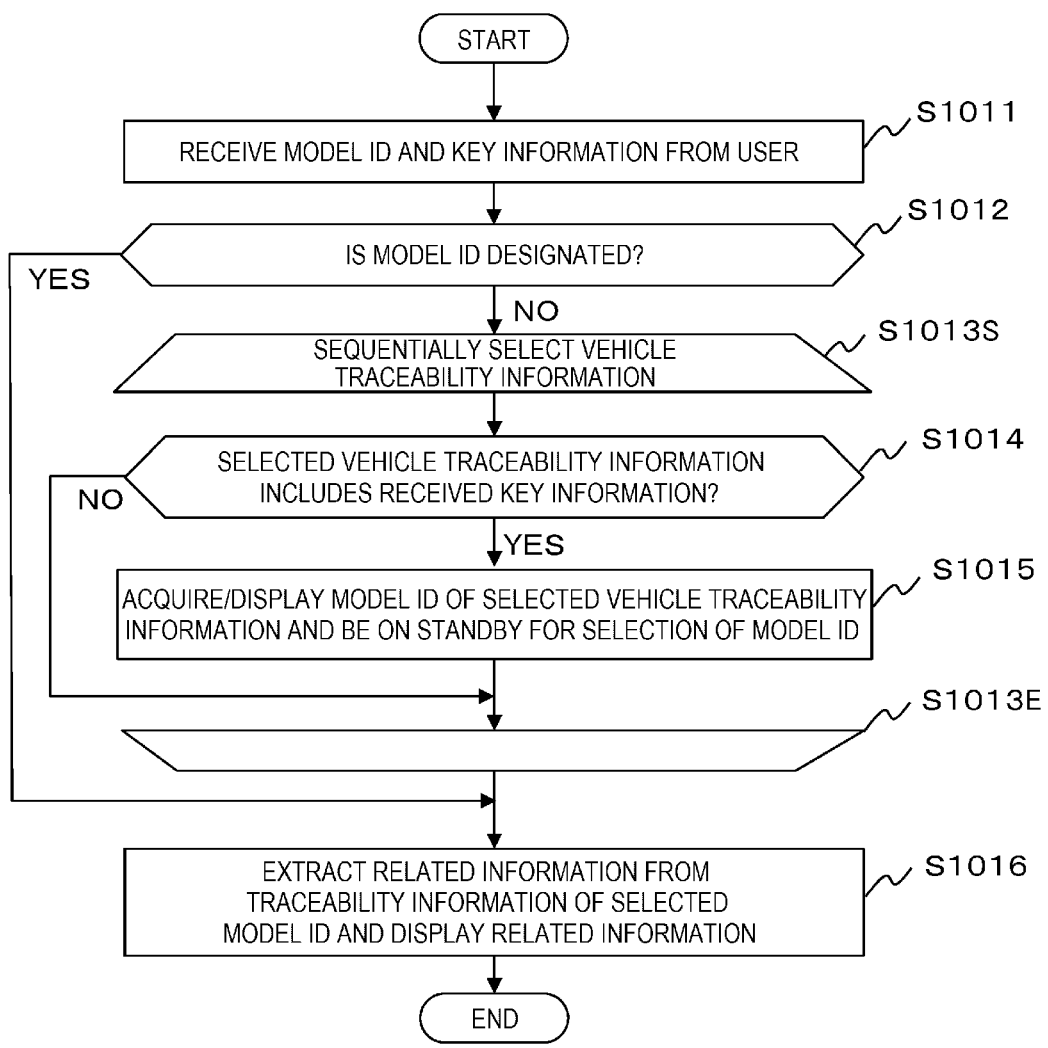
FIG. 10 is a flowchart showing a software inquiry information reference process.

FIG. 10 is a flowchart showing a process (hereinafter, referred to as a "software inquiry information reference process S1000") performed by the software inquiry information management unit 116 when the software inquiry information is referred to. Hereinafter, the software inquiry information reference process S1000 will be described with reference to FIG. 10.

First, the software inquiry information management unit 116 receives a model ID and key information from a user (S1011).

Next, the software inquiry information management unit 116 checks whether the model ID is designated by an input from the user (S1012). When the model ID is included (S1012: YES), the process proceeds to S1016, and when the model ID is not included (S1012: NO), the process proceeds to S1013S.

In subsequent loop processes S1013S to S1013E, the software inquiry information management unit 116 sequentially selects the vehicle traceability information 40 for each of all the registered model IDs.

In the above-described loop processes, first, the software inquiry information management unit 116 determines whether the selected vehicle traceability information 40 includes the key information received in S1011 (S1014). When the key information is included (S1014: YES), the process proceeds to S1015. When the key information is not included (S1014: NO), the process proceeds to S1013E, and next vehicle traceability information 40 is selected and the loop processes are performed (S1013S to S1013E).

In S1015, the software inquiry information management unit 116 acquires and displays the model ID associated with the selected vehicle traceability information 40, and is on standby for the selection of the model ID.

Subsequently, the software inquiry information management unit 116 acquires information (the regulation ID, the software inquiry number, the vehicle requirement, the qualification verification result report, and the like) related to the input key information from the vehicle traceability information 40 corresponding to the model ID input or selected by the user, and outputs the information (S1016).

Accordingly, the user can easily refer to various pieces of information (the regulation request information 22, the vehicle request specification 23, the device request specification 31, and the like) related to the software based on the designated key information, and can efficiently proceed with influence analysis and the test work at the time of software update.

User Interface

Figure 11:
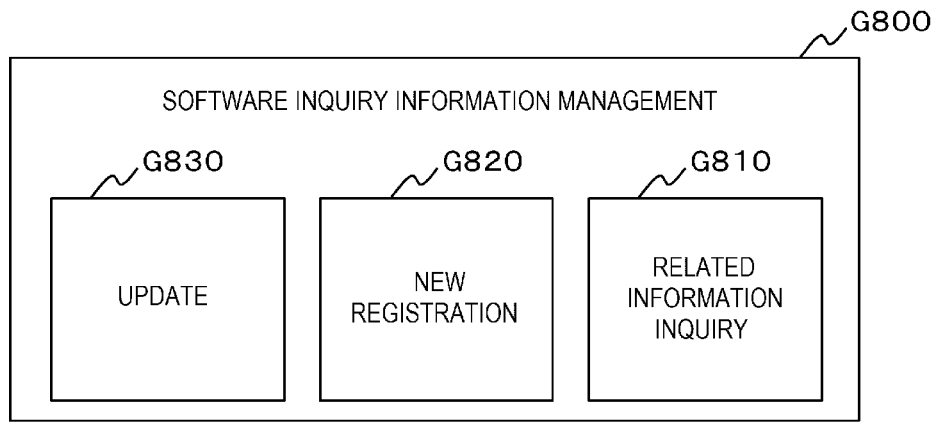
FIG. 11 shows an example of a software inquiry information management screen.

FIG. 11 shows an example of a menu screen (hereinafter, referred to as a "software inquiry information management screen G800") displayed as a user interface by the software inquiry information management unit 116. As shown in FIG. 11, the exemplified software inquiry information management screen G800 includes a related information inquiry button G810, a new registration button G820, and an update button G830.

Figure 12:
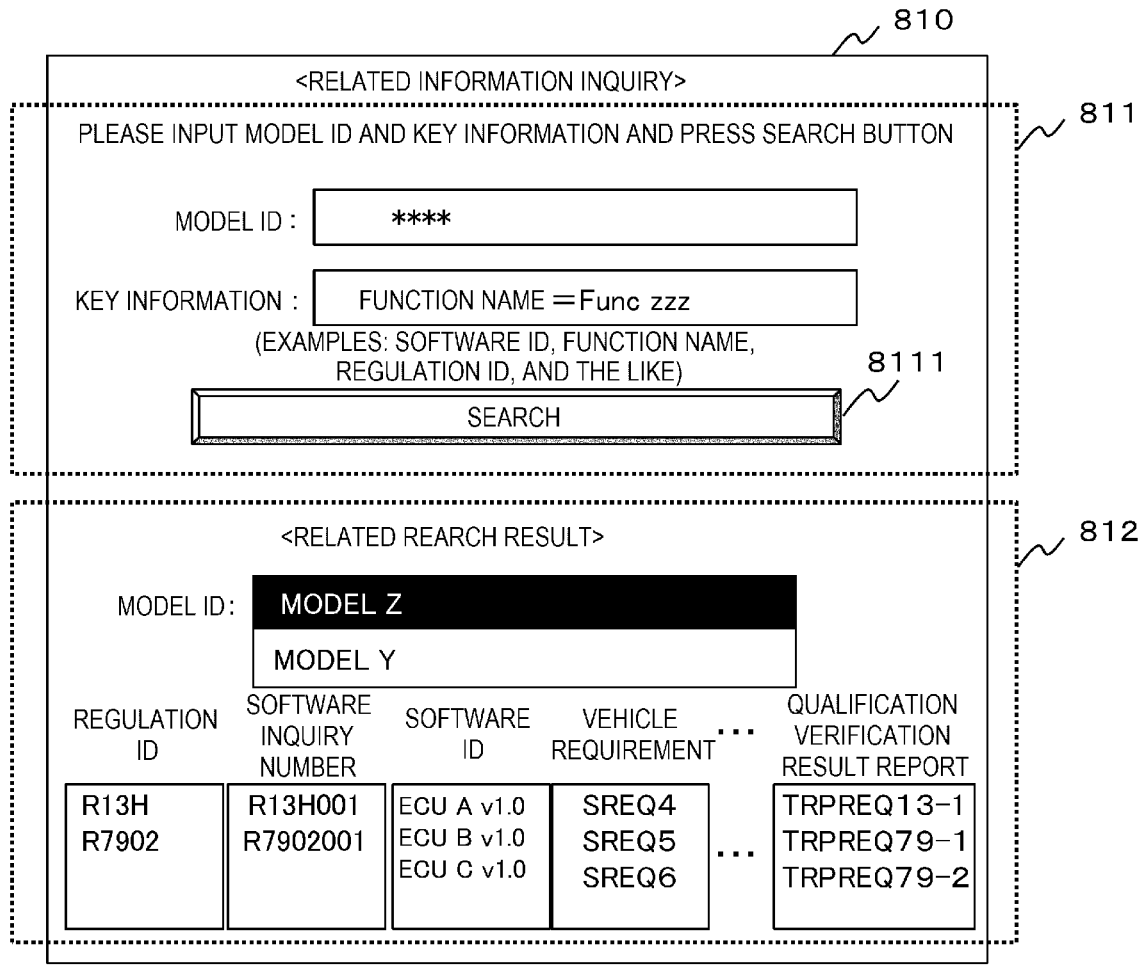
FIG. 12 shows an example of a related information inquiry screen.
Figure 13:
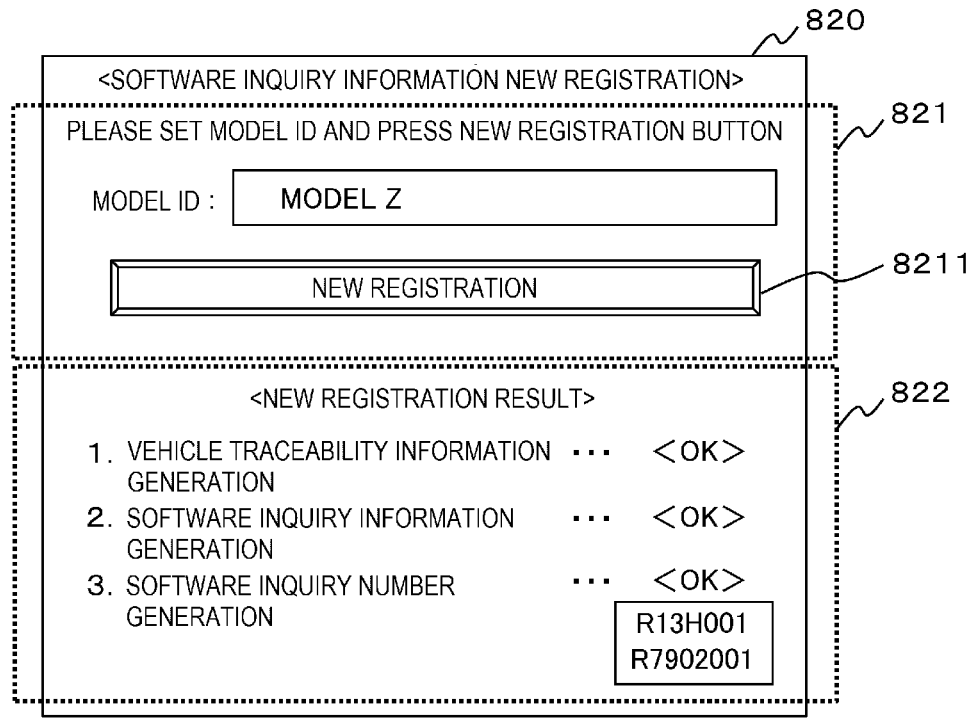
FIG. 13 shows an example of a software inquiry information new registration screen.
Figure 14:
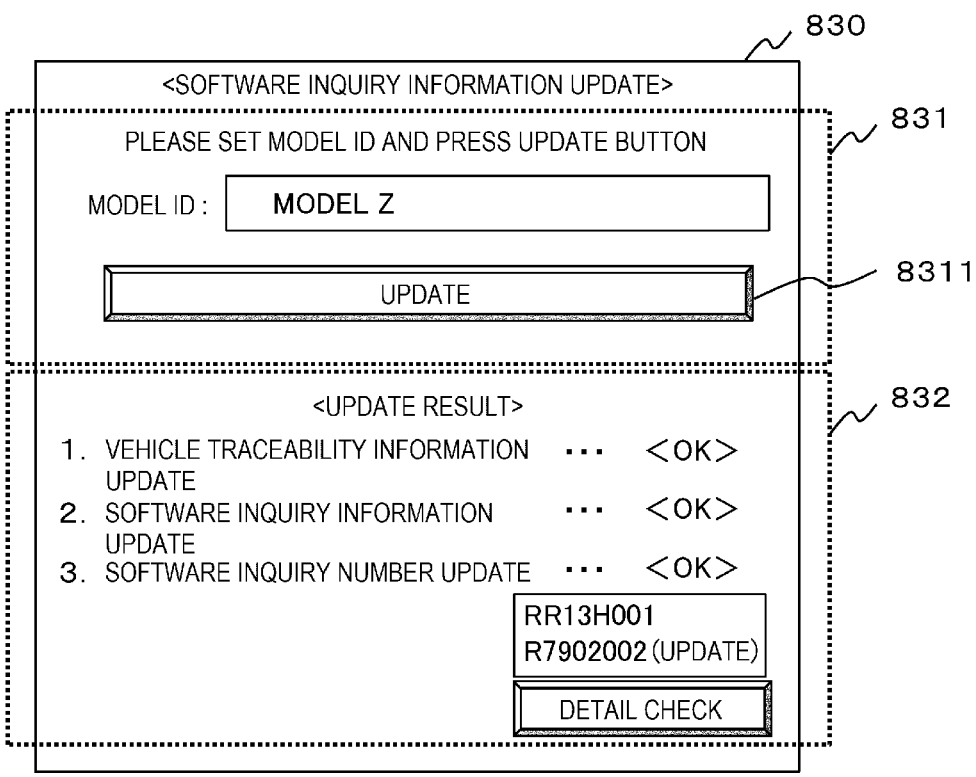
FIG. 14 shows an example of a software inquiry information update screen.

The software inquiry information management unit 116 displays a related information inquiry screen 810 shown in FIG. 12 when the related information inquiry button G810 is operated, displays a software inquiry information new registration screen 820 shown in FIG. 13 when the new registration button G820 is operated, and displays a software inquiry information update screen 830 shown in FIG. 14 when the update button G830 is operated.

As shown in FIG. 12, the related information inquiry screen 810 includes a model ID and key information input field 811, and a search result display field 812.

When the user inputs a model ID and key information in the model ID and key information input field 811 and operates a search button 8111, the software inquiry information management unit 116 receives the model ID and the key information. The software inquiry information management unit 116 uses the vehicle traceability information 40 corresponding to the input model ID to acquire, based on a function designated by the key information, various kinds of information related to thereto, and displays the acquired information in the search result display field 812 (note that the information may be provided as a link destination). When the model ID is not set in the input field 811, the software inquiry information management unit 116 selects vehicle traceability information having the function related thereto from all the vehicle traceability information, and displays a model ID thereof in the search result display field 812.

When the model ID is selected, the software inquiry information management unit 116 acquires various kinds of information using the vehicle traceability information 40 corresponding to the selected model ID, and displays the acquired information in the search result display field 812. The various kinds of information include the regulation ID D211, the software inquiry number D212, the software ID D213, the vehicle request specification 23, the system integrated verification result report 25, the qualification verification result report 26, the device request specification 31, the design document 32, the source code 33, the unit verification result report 34, the ECU integrated verification result report 35, and the ECU qualification verification result report 36.

As described above, according to the software inquiry information management system 1 in the present embodiment, when a user updates software, the user can efficiently and reliably specify software that requires a test for receiving approval due to the update. For example, when software is shared across models of vehicles, software that requires to be tested can be specified across the models of the vehicles. The user can efficiently acquire traceability information and evidence that require to be reported to authorities using the output approval software inquiry information 21.

As shown in FIG. 13, the software inquiry information new registration screen 820 includes a model ID input field 821 and a generation result display field 822.

When the user inputs a model ID in the model ID input field 821 and operates a new registration button 8211, the software inquiry information management unit 116 receives the model ID.

The software inquiry information management unit 116 generates the vehicle traceability information 40 by the traceability information conversion unit 118 and the information integration unit 114 using the traceability information 20, 30' corresponding to the input model ID. Next, the software inquiry number generation unit 115 generates software reference information and a software inquiry number.

The software inquiry information management unit 116 outputs information of a result of the generation process and the generated software inquiry number to the generation result display field 822.

As described above, according to the software inquiry information management system 1 in the present embodiment, a user can generate software inquiry information when newly developing a vehicle, and efficiently assign a combination of software necessary for approval and an inquiry number thereof.

As shown in FIG. 14, the software inquiry information update screen 830 includes a model ID input field 831 and an update result display field 832.

When the user inputs a model ID in the model ID input field 831 and operates an update button 8311, the software inquiry information management unit 116 receives the model ID.

The software inquiry information management unit 116 updates the vehicle traceability information 40 by the trace- ability information conversion unit 118 and the information integration unit 114 using the traceability information 20, 30' corresponding to the input model ID. Next, the software update management unit 117 updates software reference information and a software inquiry number.

The software inquiry information management unit 116 outputs information of a result of the update process and the updated software inquiry number to the update result display field 832. In this example, it is indicated that all of the vehicle traceability information 40, the software inquiry information, and the software inquiry number are successfully updated. A software inquiry number that may be influenced by a changed portion but is not updated is indicated as "R13H001", and a software inquiry number that is actually influenced and updated is indicated as "R7902002 (update)".

Figure 15:
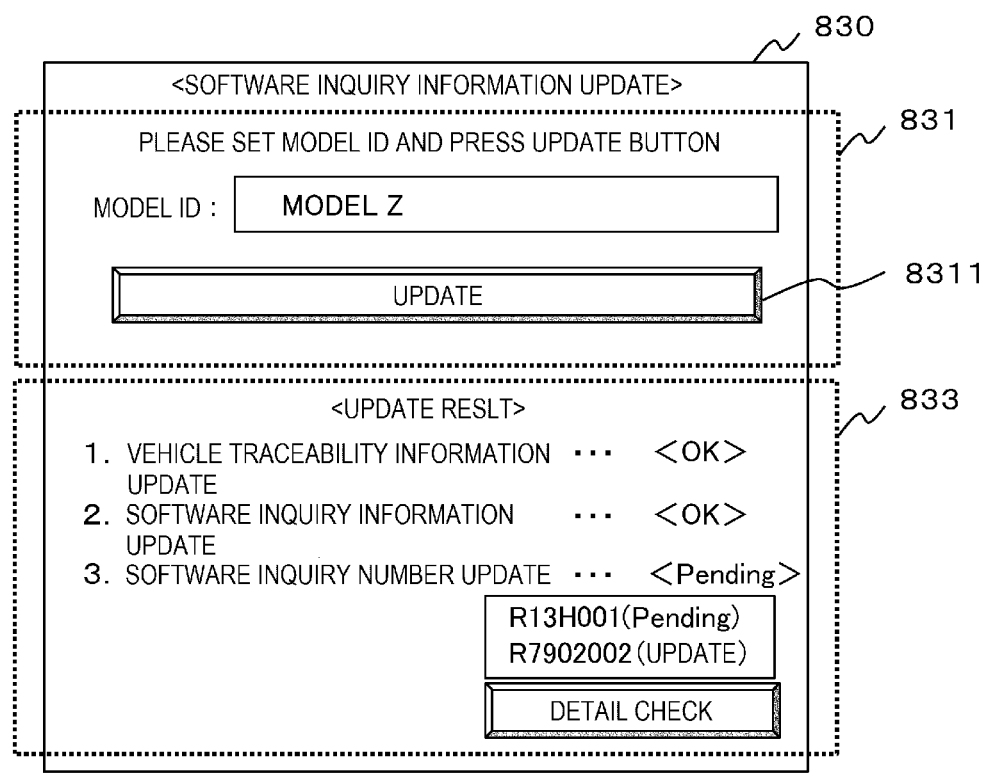
FIG. 15 shows a display example in a case where it fails to determine whether a software inquiry number needs to be updated.

FIG. 15 shows a display example in a case where the system fails to determine whether the software inquiry number needs to be updated at the time of updating the software inquiry information. The example shown in FIG. 14 has the same configuration as described above except for an update result display field 833. When the system cannot determine whether the software inquiry number needs to be updated, as shown in the update result display field 833 in FIG. 14, the update of the vehicle traceability information 40 and the software inquiry information is succeeded, and the update of the software inquiry number is pended. "R13H001 (Pending)" indicates that a software inquiry number may be influenced by a changed portion but it fails to determine whether the software inquiry number needs to be updated, and a software inquiry number that is actually influenced and updated is indicated as "R7902002 (update)".

As described above, according to the software inquiry information management system 1 in the present embodiment, a user can update software inquiry information when updating a software, and efficiently update a combination of software necessary for approval and an inquiry number thereof.

As described above in detail, according to the software inquiry information management system 1 in the present embodiment, the software inquiry information 6 can be managed in a unified manner using the approval software inquiry information 21, and information related to legal approval of software that is incorporated in a device mounted on a vehicle can be efficiently managed.

Although the embodiment of the invention has been described in detail above, the invention is not limited to the embodiment described above, and includes various modifications and equivalent configurations within the scope of the appended claims. For example, the embodiment described above has been described in detail for easy understanding of the invention, and the invention is not necessarily limited to those having all the configurations described above. A part of configurations according to a certain embodiment can be replaced with configurations according to another embodiment. A configuration according to another embodiment may be added to a configuration according to a certain embodiment. A part of the configurations according to the embodiment may be added to, deleted from, or replaced with another configuration.

In the description of the invention, an example of an ECU is shown as a component. However, a regulation request or a system request may be implemented in cooperation with not only an in-vehicle ECU but also a server device disposed outside the vehicle. In this case, the system request is decomposed into a request to the server device and a request to the vehicle, and the request to the vehicle is further decomposed into a request to the ECU. However, in the case where the request is directed to the server device, it may be considered that same management can be performed when the above-described device request specification 31 is viewed as the request to the server device. That is, it is possible to uniformly analyze influence on approval for functions across the vehicle and the server device, and the like.

In the above-described invention, the example in which the traceability information conversion unit 118 is disposed in the vehicle provider system 100 is described. However, the traceability information conversion unit 118 may be disposed in the traceability information conversion transmission unit 212 of the device supplier system 200. In this way, the vehicle supplier can receive the traceability information in a unified format.

Parts or all of the configurations, functions, processing units, processing methods and the like may be implemented by hardware by, for example, executing designing with an integrated circuit, or may be implemented by software by a processor interpreting and executing a program for implementing each function.

Information such as a program, a table, and a file for implementing each function can be stored in a storage device such as a memory, a hard disk, and a solid state drive (SSD), or a recording medium such as an integrated circuit (IC) card, an SD card, and a digital versatile disc (DVD).

Control lines and information lines indicate what is considered necessary for description, and not all the control lines and the information lines are necessarily shown in a product. It may be considered that almost all the configurations are actually connected to one another.

What is claimed is:

1. A software inquiry information management system that is an information processing system configured to manage information related to legal approval of software for implementing a function of a device mounted on a vehicle, wherein
   the software inquiry information management system is configured to
      store a device request specification in association with a regulation ID, the regulation ID being information specifying a regulation that defines a requirement for receiving legal approval for a vehicle, the device request specification being information related to a specification requested by the regulation for the device,
      acquire traceability information that is information related to traceability of the device, the traceability being associated with the device request specification, the traceability information including a software ID that specifies software to be incorporated into the device, and
      generate a software inquiry number that is information in which the regulation ID corresponding to the device request specification associated with the acquired traceability information is associated with one or more of the software IDs.

2. The software inquiry information management system according to claim 1, wherein
   the software ID includes information specifying a type of the software and version information.

3. The software inquiry information management system according to claim 1, wherein
   the software inquiry information management system is configured to generate and manage a plurality of the software inquiry numbers for each of combinations of one or more models of a vehicle, one or more of the devices, and one or more of the regulations.

4. The software inquiry information management system according to claim 3, wherein
   the traceability information includes a source code of the software, and
   the software inquiry information management system is configured to
      manage software inquiry information that is information in which the software inquiry number and the traceability information are associated with each other,
      receive key information that is information specifying the source code or a function, the function being a part of the source code,
      specify one or more software inquiry numbers including the received key information, and
      output the software inquiry information associated with the specified software inquiry number.

5. The software inquiry information management system according to claim 4, wherein
   the key information is an identifier of a function described in the source code or an identifier of a device request specification.

6. The software inquiry information management system according to claim 4, wherein
   the software inquiry information management system is configured to output one or more software IDs of the one or more specified software inquiry numbers that are included in the traceability information.

7. The software inquiry information management system according to claim 1, wherein
   the software inquiry information management system is configured to compare a vehicle approval submission document with change content or a change result of the software to determine whether the software inquiry number needs to be updated.

8. The software inquiry information management system according to claim 1, wherein
   the software inquiry information management system is communicably connected with a plurality of information processing devices that manage the traceability information, and configured to
      acquire the traceability information from each of the plurality of information processing devices, and
      convert the traceability information into traceability information described in a common data format.

9. The software inquiry information management system according to claim 4, wherein
   the software inquiry information management system is configured to store, in association with the regulation ID, regulation request information which is information indicating content requested by the regulation and vehicle request information which is information indicating content requested by the regulation for a vehicle, and
   the software inquiry information includes information in which the regulation request information, the vehicle request information, and the traceability information are associated with one another.

10. A software inquiry information management method that is a method of managing information related to legal approval of software for implementing a function of a device mounted on a vehicle, implemented by an information processing device, comprising:
   storing a device request specification in association with a regulation ID, the regulation ID being information specifying a regulation that defines a requirement for receiving legal approval for a vehicle, the device request specification being information related to a specification requested by the regulation for the device, acquiring traceability information, the traceability being information related to traceability of the device, the traceability being associated with the device request specification, and generating a software inquiry number that is information in which the regulation ID corresponding to the device request specification associated with the acquired traceability information is associated with one or more of the software IDs included in the traceability information and incorporated in the device.

11. The software inquiry information management method according to claim 10, wherein the software ID includes information specifying a type of the software and version information.

12. The software inquiry information management method according to claim 10, comprising generating and managing a plurality of software inquiry numbers for each of combinations of one or more models of a vehicle, one or more of the devices, and one or more of the regulations.

13. The software inquiry information management method according to claim 12, wherein the traceability information includes a source code of the software, and the software inquiry information management method comprising managing software inquiry information that is information in which the software inquiry number and the traceability information are associated with each other, receiving key information that is information specifying the source code or a function, the function being a part of the source code, specifying one or more of the software inquiry numbers including the received key information, and outputting the software inquiry information associated with the specified software inquiry number.

14. The software inquiry information management method according to claim 13, wherein the key information is an identifier of a function described in the source code or an identifier of a device request specification.

15. The software inquiry information management method according to claim 13, comprising outputting one or more of the software IDs of the one or more specified software inquiry numbers that are included in the traceability information.

* * * * *